(12) United States Patent
Ostman et al.

(10) Patent No.: US 7,711,385 B2
(45) Date of Patent: May 4, 2010

(54) METHOD AND SYSTEM OF TRANSMISSION POWER CONTROL

(75) Inventors: Thomas Ostman, Spanga (SE); Jan Pettersson, Jarfalla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1064 days.

(21) Appl. No.: 10/595,287

(22) PCT Filed: Oct. 7, 2003

(86) PCT No.: PCT/SE03/01559

§ 371 (c)(1),
(2), (4) Date: Apr. 5, 2006

(87) PCT Pub. No.: WO2005/034380

PCT Pub. Date: Apr. 14, 2005

(65) Prior Publication Data

US 2008/0214224 A1    Sep. 4, 2008

(51) Int. Cl.
*H04B 7/00* (2006.01)

(52) U.S. Cl. .................................... 455/522; 455/69
(58) Field of Classification Search ................. 455/522, 455/69
See application file for complete search history.

(56) References Cited

U.S. PATENT DOCUMENTS

| 5,852,782 | A | * | 12/1998 | Komatsu | .......... | 455/522 |
| 6,075,974 | A | * | 6/2000 | Saints et al. | .......... | 455/69 |
| 6,493,541 | B1 | * | 12/2002 | Gunnarsson et al. | .......... | 455/69 |

OTHER PUBLICATIONS

Swedish Patent Office International Search Report for PCT/SE03/01559, dated Apr. 15, 2004.

* cited by examiner

*Primary Examiner*—Nay A Maung
*Assistant Examiner*—Angelica M Perez
(74) *Attorney, Agent, or Firm*—Roger S. Burleigh (57) ABSTRACT

The present invention relates to cellular mobile radio systems, and more especially it relates to Code Division Multiple Access, CDMA, cellular mobile radio systems, particularly to transmission power control in such systems. A method and apparatus for transmission of compensated TPC commands when a substantial loop delay is experienced for one or more user equipment entities is disclosed.

54 Claims, 9 Drawing Sheets

METHOD AND SYSTEM OF TRANSMISSION POWER CONTROL

TECHNICAL FIELD OF THE INVENTION

The present invention relates to cellular mobile radio systems, and more especially it relates to Code Division Multiple Access, CDMA, cellular mobile radio systems, particularly to transmission power control in such systems.

BACKGROUND AND DESCRIPTION OF RELATED ART

Transmission power control, TPC, transmitting single or multiple TPC bits from a radio base station, RBS, to a mobile station, MS, or vice versa informing the receiving party to increase or decrease the transmission power level, optionally by a specified amount, is previously known.

Transmission power control compensates for signal fading and interference dynamics at a receiver. Closed loop power control according to prior art is described in relation to FIG. 1. In closed loop power control received pilot channel signal to interference ratio, SIR, is measured at the receiving end (RBS for uplink). The level of the SIR equals the SIR or a quantized value thereof. The level of the SIR is compared with a target level. Information on the outcome of the comparison is fed back in the reverse direction in the form of TPC commands. Radio wave propagation and power control processing introduces a delay in the feedback loop. To achieve a feedback loop with minimum (one slot) delay, transmission power should be measured, responded to and controlled within one slot. The transmitting end adjusts transmission power in response to received TPC commands. The receiving end receives, at a propagation delayed time, a pilot signal transmitted at the adjusted level, closing the power control loop. If the level of measured SIR is larger than the target level, the receiving end transmits a command towards the transmitting end (MS for uplink) to decrease the power at the transmitting end. If the level of the measured SIR is smaller than or equal to the target level the transmitting end is correspondingly instructed to increase the transmission power. If the level of the measured SIR is close to equal to the target level interchanging commands of transmission power increase and decrease are transmitted to keep the transmission power close to constant. The command to increase or decrease transmission power is sent by means of one or more TPC bits. A TPC command determined accordingly and within a predetermined one slot loop delay, irrespective of whether it refers to uplink or downlink power control, is called a regular TPC command in this patent application.

Figure 1:
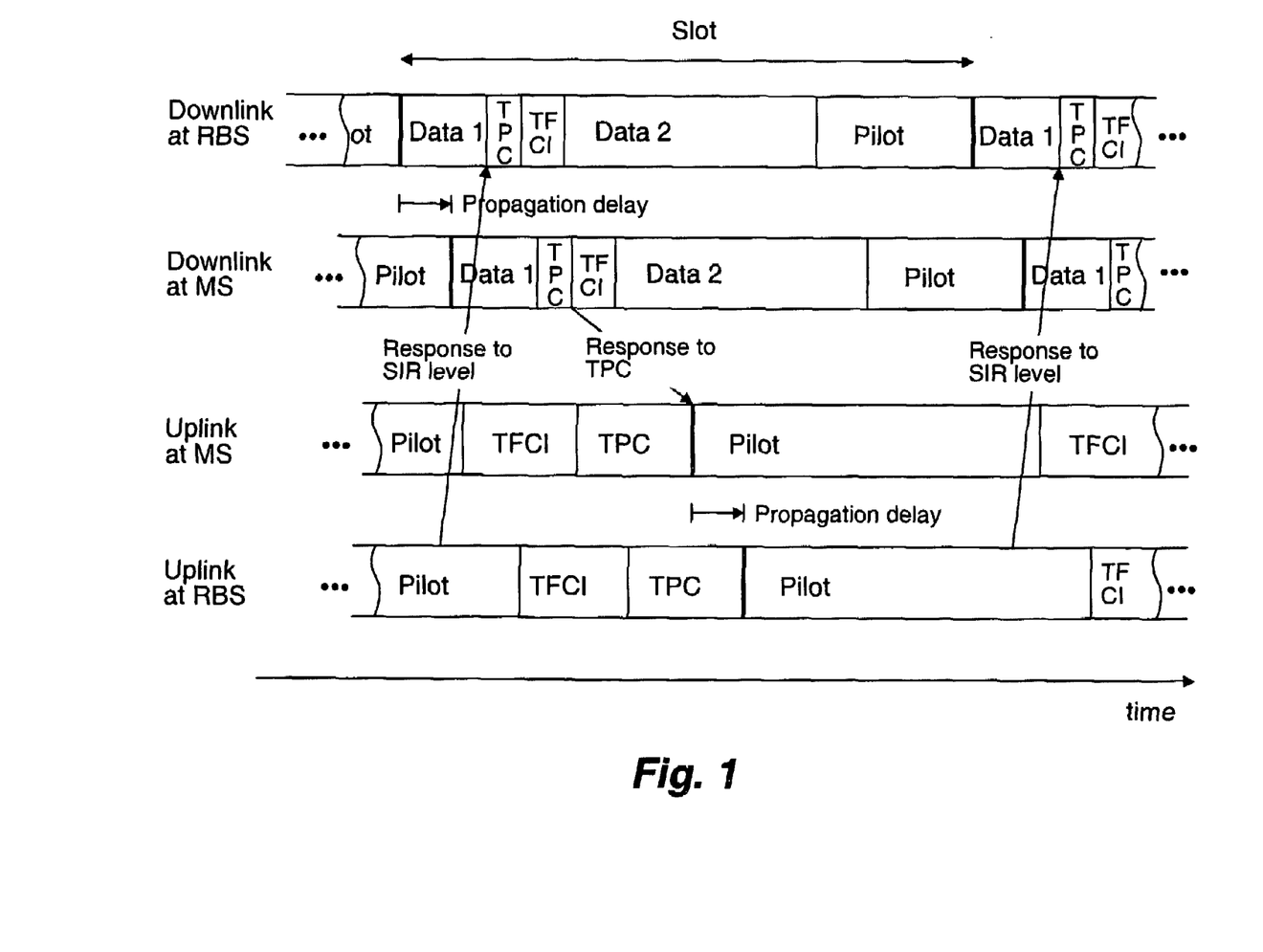
FIG. 1 displays slot content and timing, according to prior art, of transmission of TPC commands and subsequent response to TPC.

In FIG. 1, an optional, dependent on slot format and link direction, TFCI field represents a Transport Format Combination Indicator for use e.g. when several simultaneous services are included.

$3^{rd}$ Generation Partnership Project (3GPP): *Technical Specification Group Radio Access Network, Physical Layer Procedures, 3G TS 25.214 v3.3.0*, France, June 2000, specifies in annex B.1 that timing of an uplink dedicated physical channel, DPCH, is delayed by 1024 chips from the corresponding downlink DPCH to maximize cell radius within which one-slot control delay can be achieved. In the sequel this maximum radius is referred to as the one-slot distance to the base station. Basically, according to the 3GPP technical specification a TPC command comprises one bit, indicating a power increase or decrease. However, the invention does not exclude basic TPC commands comprising more than one bit. Further according to the 3GPP technical specification, during soft handover there is one such basic TPC bit or TPC command for each of the links involved, to be combined into a TPC command. Consequently, the concept "TPC command" comprises both such basic and combined TPC commands. The 3GPP Technical Specification also describes out of synchronization handling. Briefly, poor quality link sets are indicated to be out of sync. Regarding uplink power control, the MS shall shut its transmitter off during downlink out-of-sync conditions. If the receive timing for any link, during soft handover, drifts to lie outside a valid range, information shall be provided, so that the network can adjust downlink timing. Regarding downlink power control, during out-of-sync periods the TPC command transmitted shall be set as "1", i.e. it shall indicate a power increase.

European Patent Application EP0955735 discloses a method, and base and mobile stations for locating transmission power control data and pilot data in relation to each other within a slot taking into account, processing delays and propagation delays and slot offsetting between uplink and downlink.

None of the cited documents above discloses a closed loop transmission power control, TPC, with the location of TPC data within a slot fixed for two or more slots in relation to pilot symbols, the power control being adaptive to loop delays varying to be larger than or smaller than the duration of one slot.

SUMMARY OF THE INVENTION

If the distance between the MS and the RBS is larger than the one-slot distance, the power control loop delay will cause TPC commands to be issued in a slot later than the transmission instant. If the distance is close to the one-slot distance, it is likely for the control loop delay to vary between one and two slots due to movements of the mobile station. If the loop delay is larger than one slot and a TPC command needs to be transmitted within one slot, the TPC command will be transmitted prior to estimation of channel quality of corresponding slot has been completed. Correspondingly, if loop delay is larger than two, three, four, etc. slots and a TPC command needs to be transmitted within two, three, four etc. slots respectively, the TPC command will be transmitted prior to estimation of channel quality has been completed.

TPC commanded power level tends to oscillate particularly for immovable user equipment or user equipment moved at low speed. This is even more predominant if SIR data is filtered with long integration time for SIR measurements.

Consequently, there is a need to assign a TPC command and find a basis for the assignment that avoids excessive variations or oscillations.

There is a problem in assigning the TPC command such that interference level is not increased and the connection is not lost. If transmission power would have been commanded to decrease were the loop delay not larger than one slot, the interference level to other users could increase if the assigned TPC command indicates a power increase. Similarly, if transmission power would have been commanded to increase were the loop delay not larger than one slot, the connection could be lost if the assigned TPC command indicates a power decrease. The restriction of TPC commands to indicate only a transmission power increase or decrease, in accordance with the 3GPP Technical Specification, makes the assignment critical.

The TPC command assignment should take into account a transitional phase when the loop delay increases or decreases to pass a slot-border. It should also apply in a (quasi-) stationary environment with loop delays larger than one (or more) slot intervals.

It is consequently an object of the present invention to achieve transmission power control that is stable when transmission power control loop delay increases beyond a slot border.

It is also an object to achieve a system stabilized for loop delays essentially not varying over time.

An object is also to have a transmission power control that is stable and robust.

Another object is to estimate transmission power control loop delay.

Finally, it is an object to reduce radio interference between different connections and reduce transmission power level in a cell of a cellular radio communications system.

These objects are met by a method and apparatus transmitting a TPC command based upon a latest available earlier measurement adjusting for excessive oscillating variability by a quasi-periodic correcting signal with a cycle time corresponding to half the TPC control delay.

DESCRIPTION OF PREFERRED EMBODIMENTS

In particularly a CDMA system it is important to control the uplink (and downlink) transmission power to a level not larger than necessary in order to keep the interference level and power consumption of the system at a minimum.

Figure 2:
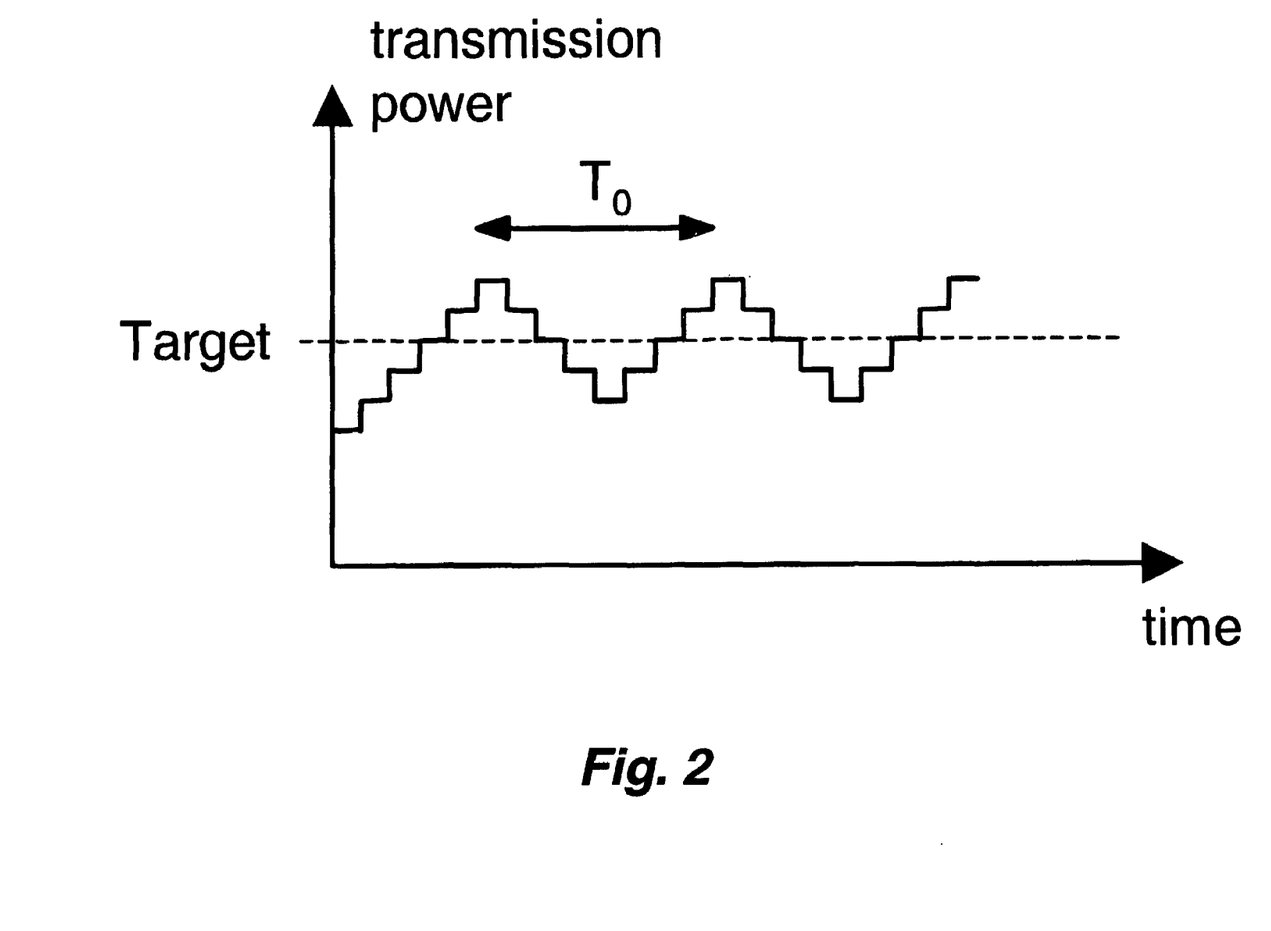
FIG. 2 illustrates an incrementally commanded power level versus time, with oscillations of cycle time corresponding to eight slot intervals.

Loop delays tend to create an oscillatory behavior of controlled transmission power as illustrated in FIG. 2. The cycle time, $T_0$, of oscillations depends on loop delay.

There are present solutions to reduce or eliminate the influence from excessive loop delay that operate satisfactorily for user equipment moving at high or medium speed, the motion causing loop delay to vary. However, for immovable or slowly moving terminals such solutions do not apply.

The invention operates using smallest available loop delay and compensates for oscillations as they occur. The loop delay depends not only on distance between base station and user equipment but also on load and user terminal performance.

In prior art, oscillation peaks may well cause transmission power to pass beyond SIR target, thereby introducing excess interference and reducing system performance.

Received pilot bits, used for SIR measurement, may be detected for evaluation or filtered for estimation of received transmission power. In the latter case additional delay and associated oscillating behavior is introduced, further contributing to oscillatory behavior. Also this negative contribution is compensated for according to the invention.

The invention detects oscillatory behavior of the controlled power control level. A quasi-stationary cycle time, or equivalently a quasi-stationary frequency component, is preferably used for estimating closed loop transmission power control loop-delay.

Transmission power control, TPC, commands are predistorted to compensate for oscillations when present. During transitional phases, when there are no full periods for loop delay estimations, preferably no predistorsion is introduced.

According to prior art, radio receiving entity sends to radio transmitting entity 1500 TPC commands per second, each indicating whether transmission power should be increased or reduced. The command is determined in accordance with received signal and interference levels as compared to one or more targets.

A preferred estimate of the loop delay is ¼ of quasi-stationary cycle time as determined or, equivalently, $1/(4f_o)$, where $f_o$ is detected quasi-stationary oscillation frequency. Units of time are e.g. (fractions of) seconds or number of slots or power control regulation intervals.

According to a preferred mode of the invention, oscillations to be compensated, if any, in commanded transmission power are analyzed in frequency domain. Oscillations to be compensated are detected when one frequency component, $f_o$, smaller than the TPC command rate, strongly dominates over others, if any.

According to a second mode of the invention, all frequency components above a threshold are compared to frequency components below the threshold. If accumulated power of frequencies below the threshold dominates accumulated power of frequencies above the threshold, oscillation to be compensated for is considered to prevail.

Figure 3:
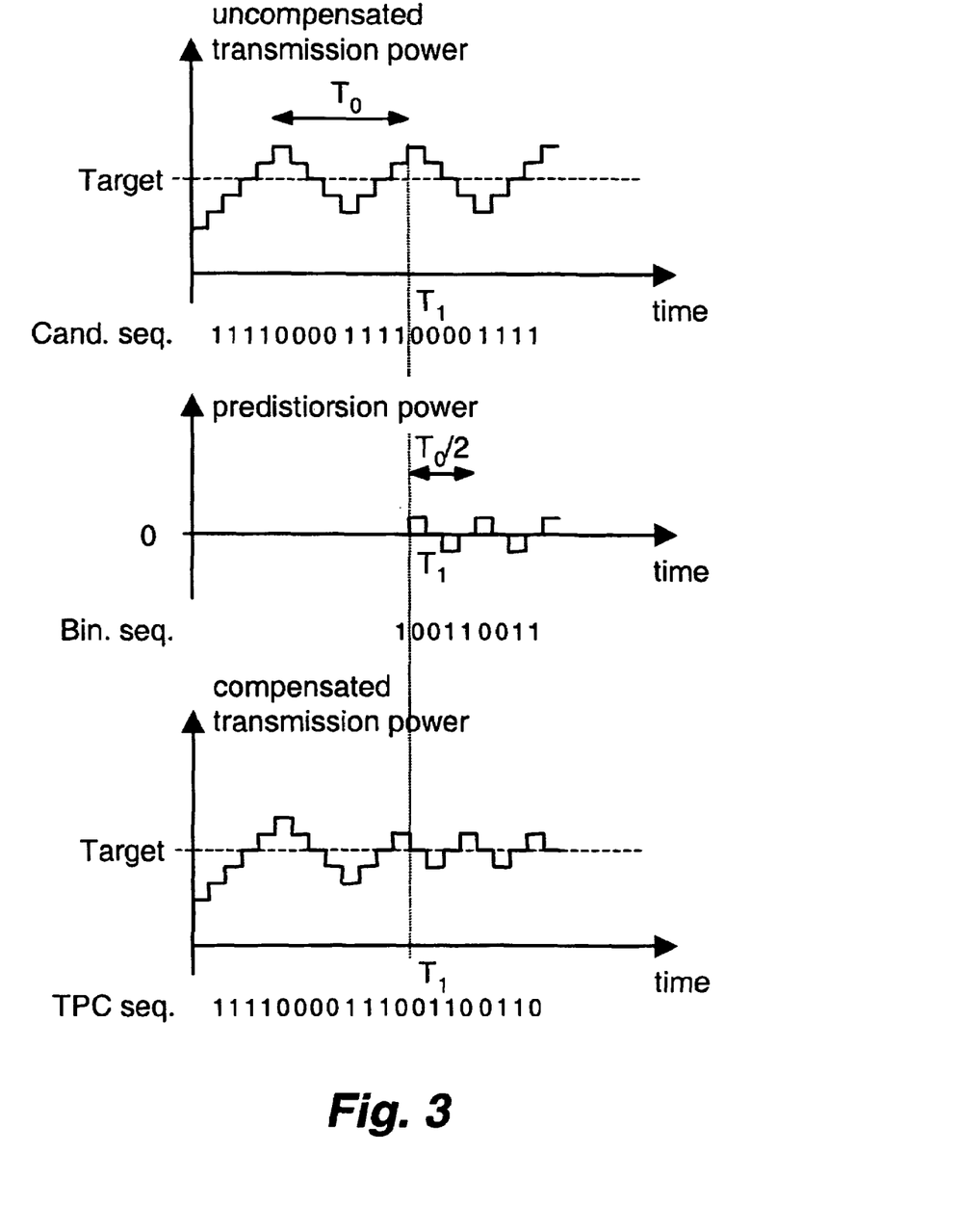
FIG. 3 illustrates an incrementally commanded power level versus time, compensated according to the invention.

A preferred predistorsion of an oscillating uncompensated TPC commanded power level is illustrated in FIG. 3.

Initially, a periodic predistorsion signal halving cycle time and amplitude (peak-peak) to ½ of an uncompensated TPC command sequence power level <<uncompensated transmission power>> oscillation cycle time and amplitude (peak-peak), respectively. A binary sequence <<Bin. seq.>> corresponding to TPC commands (0/1) as would cause a power change corresponding to the predistorsion signal <<predistorsion power>> is determined and added modulo-2 to the uncompensated candidate TPC command sequence (0/1) <<Cand. seq.>> to achieve the compensated TPC commands (0/1) <<TPC seq.>> command by command prior to transmission of the respective TPC commands. Of course, the same resulting signal would be achieved if the compensation signal and the uncompensated TPC commands were antipodal (±1) and the signal components were multiplied, as the different representations are algebraically equivalent.

Figure 4:
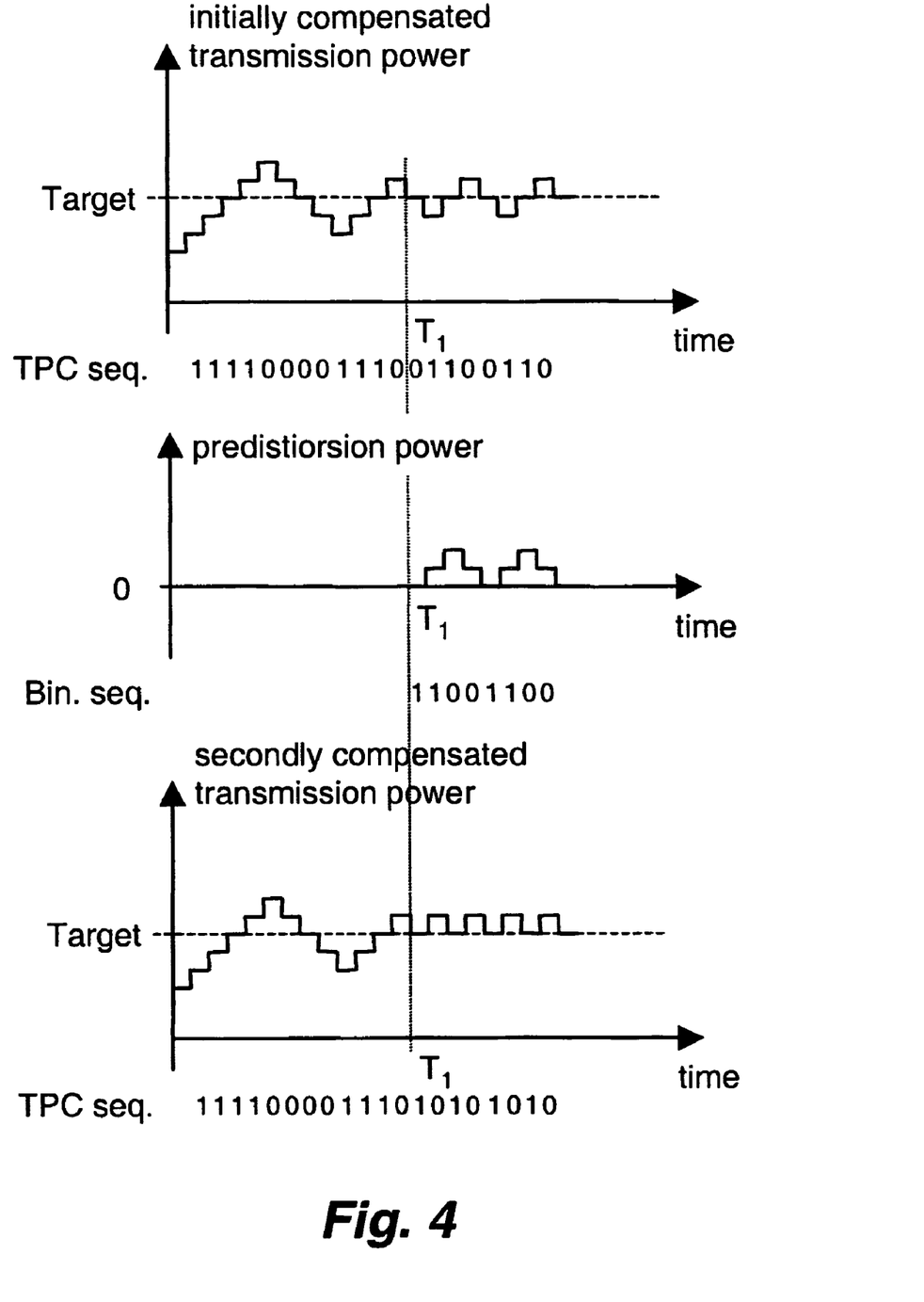
FIG. 4 demonstrates a refined power level versus time compensation, according to the invention.

Subsequently, the process may be repeated for refined compensation, halving the cycle time and peak-peak amplitude of the initially compensated periodic signal. This can be repeated until the cycle time equals two slots. This additional step is illustrated in FIG. 44.

Of course, the above-mentioned repeated refinement does not necessarily imply that the compensation is actually performed recursively. It can be achieved by adding a compensating sequence at once with a resulting transmission power control command sequence equivalent to iteratively determined compensation.

In one mode of the invention, the compensating sequence is produced by means of a neural network in a back-propagation arrangement.

Another mode of the invention uses predefined sub-sequences for compensation.

In a further mode of the invention the sub-sequences for compensation are generated pseudo-randomly.

It is preferred that predistorsion is introduced not until a predefined number of slots indicate oscillation to be compensated. In the illustrated example of FIG. 3 predistorsion is started at time $T_1$ after 12 slots, corresponding to 1.5 cycles of oscillation or 6 times loop delay (using the estimation ratio of 4), for the particular example.

Predistorsion is interrupted (or not introduced) when all TPC commands commanding power changes in one and the same direction (transmission power increase or decrease) during an interval corresponding to loop delay as estimated are obtained.

The invention covers three embodiments:
1. single connection predistorsion,
2. single connection filtering, and
3. plural connections predistorsion at cell level.

Figure 5:
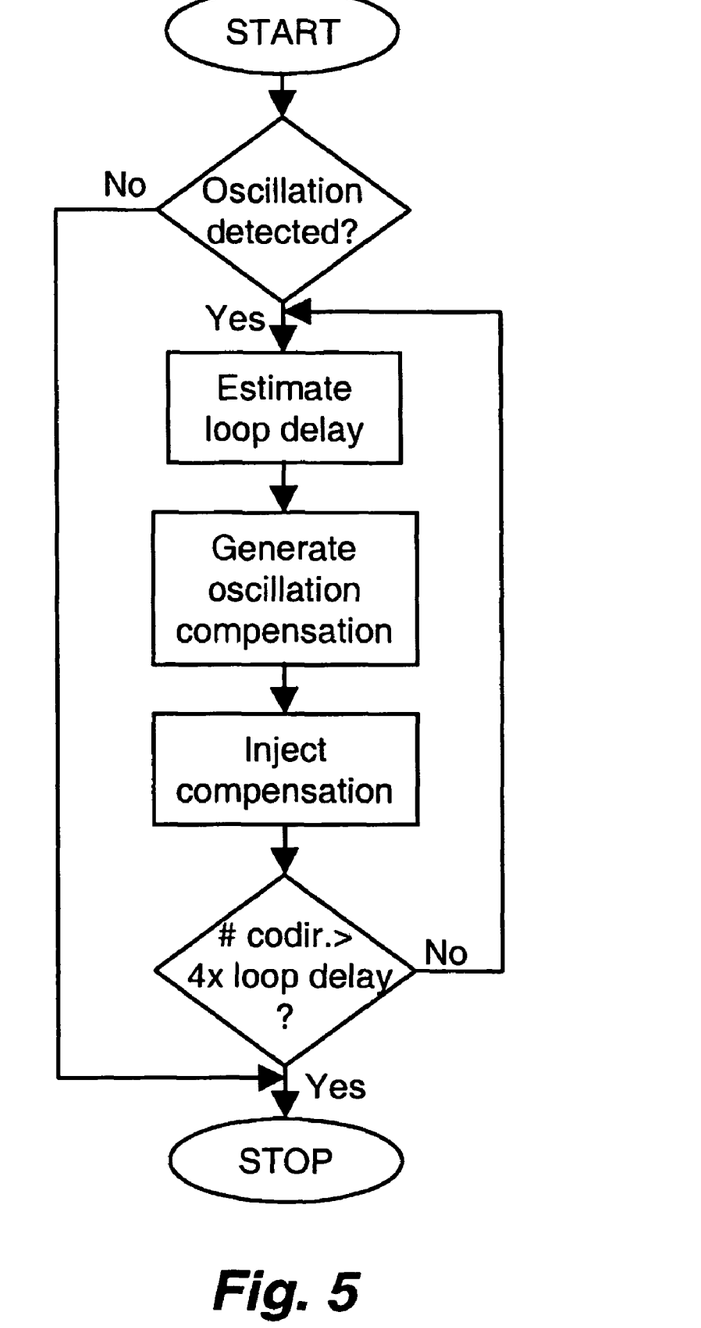
FIG. 5 illustrates a flow chart of a method according to embodiment 1 of the invention.

FIG. 5 illustrates a flow chart of a method according to embodiment 1 of the invention. If oscillation is detected, preferably using frequency analysis as described above, loop delay is estimated, preferably to ¼ of the dominating frequency component's cycle time according to the frequency analysis. A compensation signal, preferably of half the peak-peak amplitude and half the cycle time of the dominating frequency component of the uncompensated transmission power control signal, is generated and injected to the uncompensated transmission power control signal. The compensation process repeats for successive transmission power control commands until the number of consecutive identical power control commands exceeds a predefined number, preferably corresponding to earlier estimated cycle time of the uncompensated commanded power level.

Figure 6:
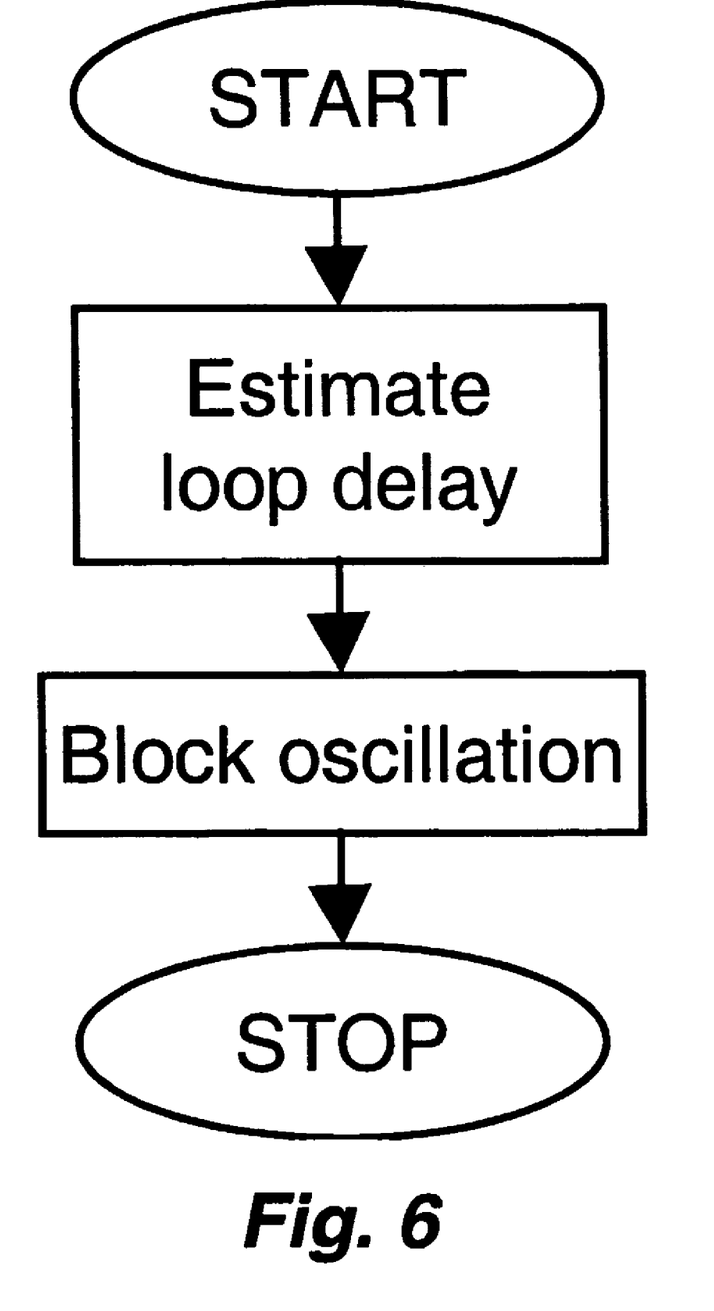
FIG. 6 shows a schematic flow chart of embodiment 2 of the invention.

FIG. 6 shows a schematic flow chart of embodiment 2 of the invention. Loop delay is continuously estimated, preferably by means of frequency analysis. According to the first mode of the invention one or more dominating frequency components, smaller than the TPC command rate, are blocked, preferably by filtering out these frequency components. The second mode of the invention indicates whether transmission power control could be relaxed or not. If frequency components below the dominating oscillation frequency are dominant transmission power control faster than the dominating oscillation frequency is required. In cases when frequency components above the dominating oscillation frequency are dominant, requirement on transmission power control speed could be relaxed as long as the power control commands are sent with a smallest frequency corresponding to the oscillation frequency.

Figure 7:
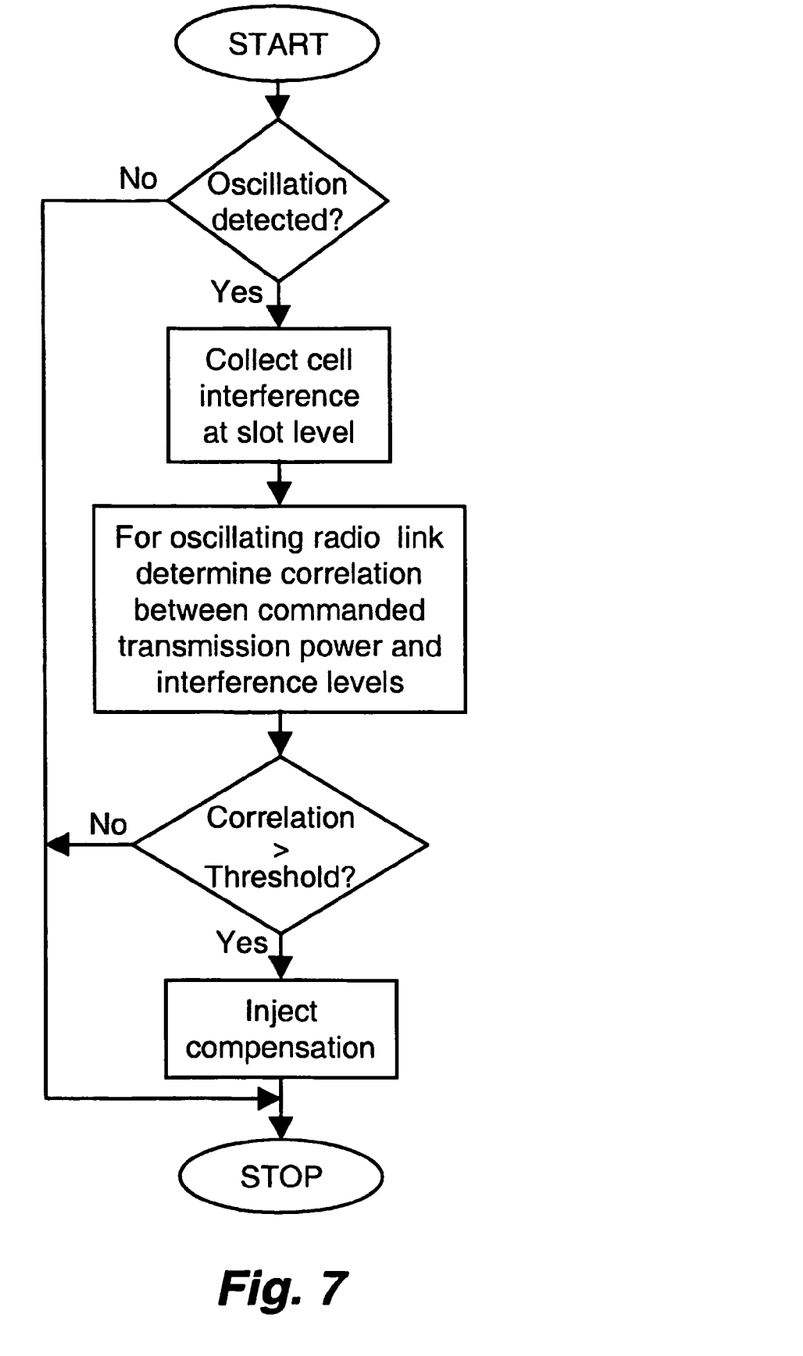
FIG. 7 depicts schematically a flow chart of embodiment 3 of the invention for one radio link.

FIG. 7 depicts schematically a flow chart of embodiment 3 of the invention for one radio link. All radio links are continuously monitored for oscillations in their respective uncompensated TPC command power level, preferably by means of frequency analyses in the above-mentioned modes of invention. Also continuously, cell interference level is monitored for each slot. For each oscillating radio link, TPC command power level and interference level are correlated on a slot-by-slot basis. When the correlation exceeds a predefined threshold, co-variation is considered to prevail and a predistorsion pattern is injected to the uncompensated transmission power control signal for the radio link, as described above in relation to FIG. 3.

In an alternative embodiment, the cell interference measurement and correlation with cell interference level is replaced by per cell pair-wise correlations of uncompensated TPC command power levels of the various radio links and a predistorsion pattern is injected to one of the uncompensated transmission power control signals at a time.

Figure 8:
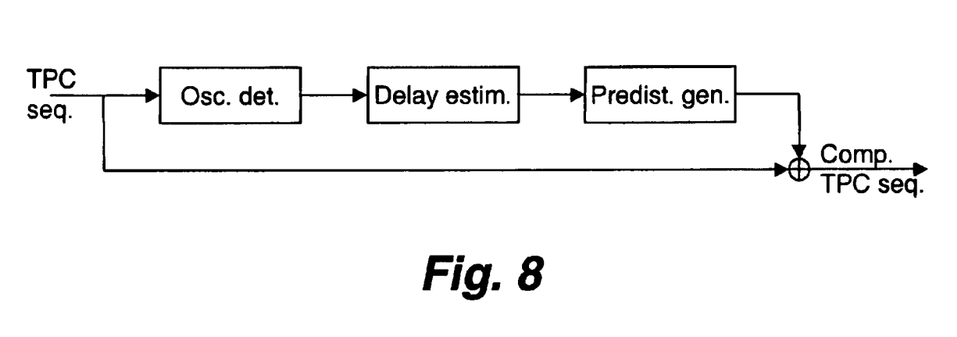
FIG. 8 shows a block diagram according to embodiment 1 of the invention.

FIG. 8 shows a block diagram according to embodiment 1 of the invention. An uncompensated TPC command sequence is fed to an oscillation detector <<Osc. det.>>. As mentioned above the oscillation detector preferably comprises a frequency analyzing entity. An output signal from the oscillation detector is entered to processing circuitry <<Delay estim.>> for loop delay estimation. Preferably, the delay is estimated based upon oscillation frequency or cycle time being output from the oscillation detector. A predistorsion pattern is generated in a subsequent processing entity <<Predist. gen.>>. The predistorsion pattern is generated in accordance with the loop delay and peak-peak amplitude of the oscillating component. With a binary (0/1) representation the compensating signal from the predistorsion pattern generator <<Predist. gen.>> is added modulo-2 to the uncompensated TPC command sequence. With an antipodal representation the summing entity of FIG. 8 is replaced by a multiplying entity.

Figure 9:
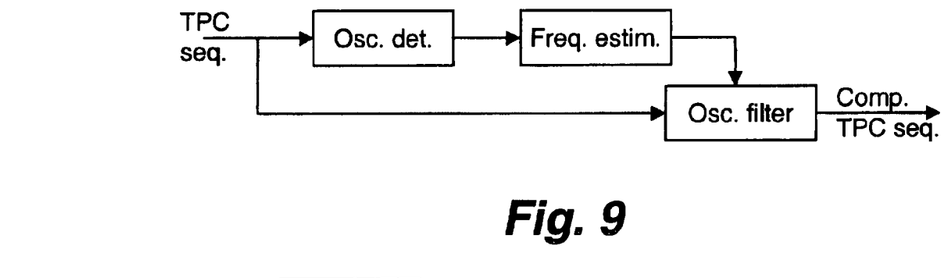
FIG. 9 illustrates a block diagram according to embodiment 2 of the invention.

FIG. 9 illustrates a block diagram according to embodiment 2 of the invention. An uncompensated TPC command sequence is fed to an oscillation detector <<Osc. det.>>. As mentioned above the oscillation detector preferably comprises a frequency analyzing entity. An output signal from the oscillation detector is entered to processing circuitry <<Freq. estim.>> for loop delay estimation. Preferably, the delay is estimated based upon oscillation frequency being output from the oscillation detector. The oscillation frequency is entered into a programmable oscillation filter <<Osc. filter>> filtering the uncompensated TPC command sequence <<TPC seq.>> to achieve a compensated TPC command sequence <<Comp. TPC seq.>>. The oscillation filter is preferably a digital filter. In an alternative realization filtering is performed in frequency domain and including subsequent inverse transformation to time domain.

Figure 10:
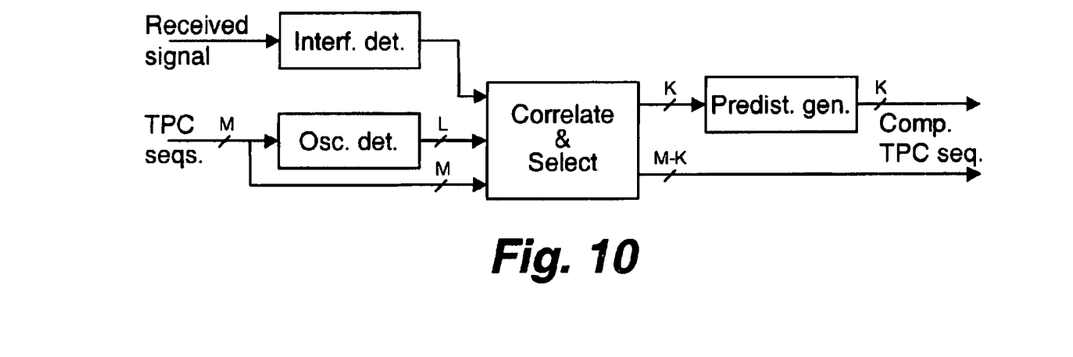
FIG. 10 presents a block diagram according to embodiment 3 of the invention.

FIG. 10 presents a block diagram according to embodiment 3 of the invention. M uncompensated one or more TPC command sequences are fed to one or more oscillation detectors <<Osc. det.>>. In the figure oscillations are assumed to be detected for L out the M uncompensated one or more TPC command sequences. These one or more TPC command sequences are passed to a processing entity <<Compare & Select>>. One or more received signals at the radio receiver that are not involved in communications to which the M uncompensated one or more TPC command sequences relate are identified, if any, in an interference detector <<Interf. det.>>. The interference detector operates similar to interference detectors for estimation of signal-to-interference ratio, but in addition preferably identifies individual interfering signals. The one or more interfering signals and the L power levels, corresponding to the L out of M uncompensated one or more TPC command sequences, considered to oscillate are input to a processing entity <<Correlate & Select>> selecting K out of the L uncompensated one or more TPC command sequences for predistorsion if interference correlation exceeds a predetermined threshold. Each of the K uncompensated one or more TPC command sequences considered correlated with interference are compensated as described above for single connection predistorsion according to embodiment 1. The remaining M-K uncompensated one or more TPC command sequences are transmitted without predistorsion injection.

Figure 11:
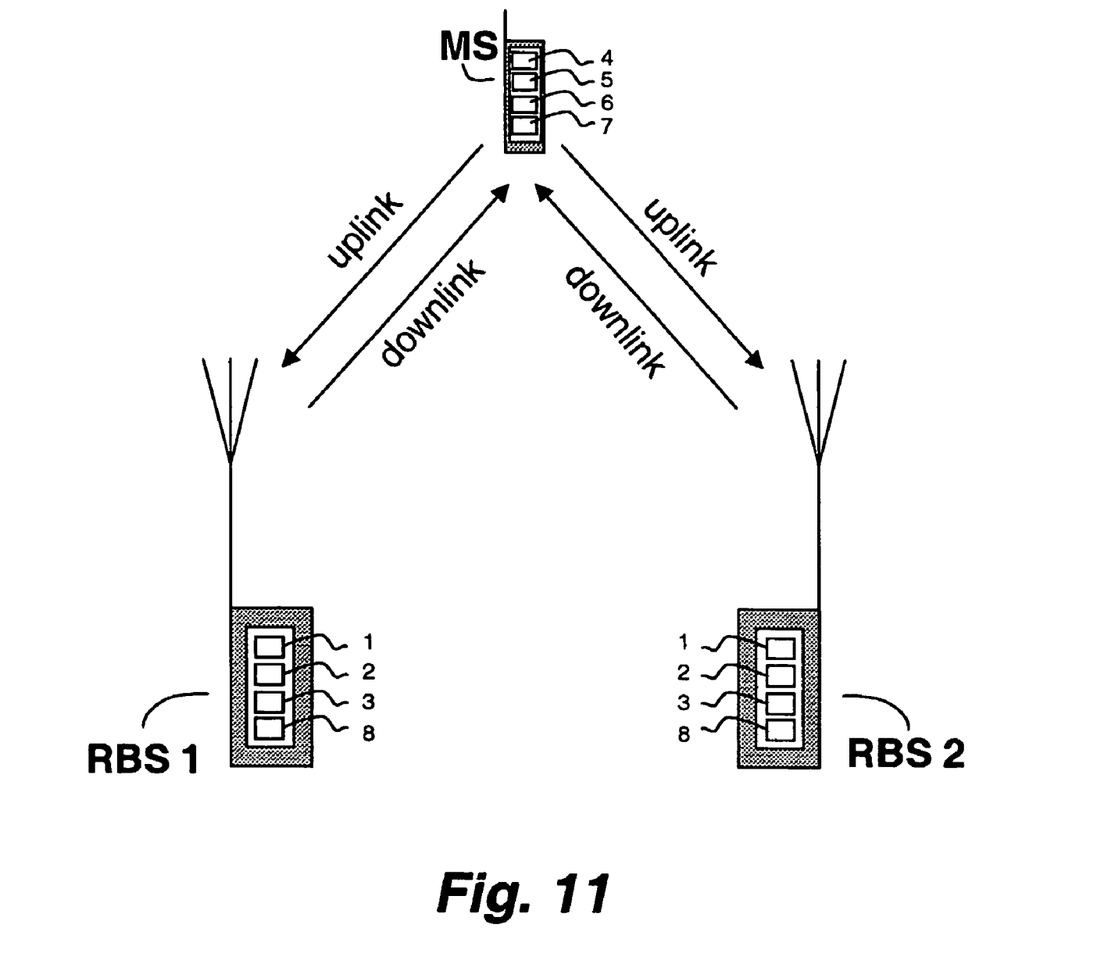
FIG. 11 schematically illustrates a mobile station and two radio base stations, according to the invention.

FIG. 11 schematically illustrates a subsystem including an MS and two RBSs according to the invention. The system instruments the embodiments described above. In this figure the RBSs are indicated to operate omnidirectionally. However, the invention is not limited to omnidirectional radio base stations. It can readily be used irrespective of whether the RBSes use directional or omnidirectional antenna radiation patterns. A first radio base station RBS 1 is provided, according to the three embodiments of the invention, with means 1 for oscillation analysis and means 2 for predistorsion injection according to embodiments 1 and 3 or means 2 for oscillation blocking according to embodiment 2 of the invention. RBS 1 and RBS 2 are equipped with logic and processing capacity 3 as previously described for the embodiments. The means can be included in the RBS or connected as one or more separate devices. The MS is furnished with means 4 for identifying and responding to received power control commands. The radio base station RBS 1 or RBS 2 receives signals on an uplink, the received signal quality and loop delay forming a basis of the TPC command. The TPC command is transmitted on the downlink for transmission power control of the MS, so called uplink power control. If the invention is applied for downlink power control, transmission power of the RBS is controlled correspondingly reversing the roles of the RBS and MS. For this situation, the MS is illustrated including means 5, 6 and 7 corresponding to means 1, 2 and 3 respectively of the RBS, and the RBS is furnished with means 8 corresponding to means 4 of the MS. For downlink power control compensation is preferably located to the RBS. Thereby, also excessive transmission power due to a plurality of mobile stations requesting transmission power increase can be avoided.

A person skilled in the art readily understands that the receiver and transmitter properties of an RBS or an MS are general in nature. The use of concepts such as RBS or MS within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without a subscriber identity module, SIM, as well as user equipment including one or more SIMs.

The invention is not intended to be limited only to the embodiments described in detail above. Changes and modifications may be made without departing from the invention. It covers all modifications within the scope of the following claims.

The invention claimed is:

1. A method of transmission power control, comprising the steps of:
    detecting oscillation in an uncompensated transmission power level corresponding to an established transmission power control command sequence; and,
    compensating the established transmission power control command sequence for the oscillation in the uncompensated transmission power level, comprising the step of injecting a compensating sequence into the established transmission power control command sequence.

2. The method according to claim 1, wherein the compensating sequence is generated in a neural network.

3. The method according to claim 2, wherein the compensating sequence is generated by means of back-propagation.

4. The method according to claim 1, wherein the compensating sequence is generated by concatenating one or more pre-defined sequences.

5. The method according to claim 1, wherein the compensating sequence is generated by concatenating one or more pseudo-random sequences.

6. The method according to claim 1, wherein the compensated transmission power control is achieved by adding modulo-2 of a compensating sequence to the established transmission power control command sequence.

7. The method according to claim 6, wherein the sequences' one or more components are either 0 or 1, or a multiple thereof.

8. The method according to claim 1, wherein the compensated transmission power control is achieved by component-wise multiplication of a compensating sequence to the established transmission power control command sequence.

9. The method according to claim 8, wherein the sequences' one or more components are either +1 or −1, or a multiple thereof.

10. The method according to claim 1, wherein the step of compensating comprises blocking of one or more frequency components of the established transmission power control command sequence thereby forming a compensated transmission power control command sequence.

11. The method according to claim 10, wherein the blocking is achieved by means of filtering.

12. The method according to claim 10, wherein one or more transmission power control command components representing one or more frequencies greater than the oscillation frequency of the oscillations in the corresponding transmission power level are filtered out, entirely or partially if power of frequency components above the oscillation frequency are greater than power of frequency components below, and that one or more transmission power control command components representing one or more frequencies essentially equal to the oscillation frequency are filtered out essentially entirely.

13. The method according to claim 11, wherein one or more transmission power control command components representing one or more frequencies essentially equal to the oscillation frequency of the oscillations in the corresponding transmission power level are filtered out, essentially entirely, if power of frequency components below the oscillation frequency are greater than power of frequency components above.

14. The method according to claim 10, wherein the blocking is achieved by means of canceling frequency transform coefficients of a frequency transformed signal.

15. The method according to claim 10, wherein one or more frequency components below a frequency threshold are blocked.

16. The method according to claim 15, wherein one or more frequency components of energy larger than energy of frequency content above the threshold are blocked.

17. The method according to claim 15, wherein the frequency threshold is set essentially equal to the oscillation frequency.

18. The method according to claim 1, wherein oscillation is detected by means of frequency analysis.

19. The method according to claim 1, wherein loop delay is estimated in relation to oscillation cycle time.

20. The method according to claim 19, wherein loop delay is estimated to be essentially equal to one fourth of the cycle time.

21. The method according to claim 1, wherein identified oscillation is compensated until the number of identical transmission power control commands of the established transmission power control command sequence exceeds a threshold.

22. The method according to claim 21, wherein the threshold corresponds to essentially four times the loop delay.

23. The method according to claim 1, wherein oscillations of one or more radio links, for which transmission power level and cell interference are correlated to a greater extent than indicated by a predefined threshold, are compensated for.

24. The method according to claim 1, wherein the oscillations are compensated at the receiver.

25. The method according to claim 24, wherein the receiver is a radio base station, or is included in or connected to a radio base station.

26. The method according to claim 24, wherein the receiver is a mobile station, or is included in or connected to a mobile station.

27. The method according to claim 1, wherein the oscillations are compensated at the transmitter.

28. The method according to claim 27, wherein the transmitter compensates received respective transmission power control commands of different mobile stations adjusted for its peak transmission power capacity.

29. The method according to claim 27, wherein the transmitter is a radio base station, or is included in or connected to a radio base station.

30. The method according to claim 27, wherein the transmitter is a mobile station, or is included in or connected to a mobile station.

31. An apparatus for transmission power control, comprising:
an oscillation detector; and,
oscillation compensating means for compensating for oscillations as detected in corresponding uncompensated commanded transmission power level of one or more established transmission power control command sequences, the compensating means injecting a compensating sequence into the established transmission power control command sequence.

32. The apparatus according to claim 31, wherein the compensating means comprises a processing element for performing component-wise algebraic operations on a compensating sequence and the established transmission power control command sequence to form a compensated transmission power control command sequence.

33. The apparatus according to claim 32, further comprising a neural network for generating the compensating sequence.

34. The apparatus according to claim 33, wherein the neural network comprises a back-propagation arrangement.

35. The apparatus according to claim 32, further comprising means for concatenating one or more pre-defined sequences for generating the compensating sequence.

36. The apparatus according to claim 32, further comprising a pseudo-random number generator generating the compensating sequence in whole or part.

37. The apparatus according to claim 32, wherein the processing element performs component-wise algebraic operations being a modulo-2 adder, component-wise adding a compensating sequence to the established transmission power control command sequence.

38. The apparatus according to claim 37, wherein the added sequences' one or more components are either 0 or 1, or a multiple thereof.

39. The apparatus according to claim 32, wherein the processing element performs component-wise algebraic operations being a multiplier, component-wise multiplying a compensating sequence and the established transmission power control command sequence.

40. The apparatus according to claim 39, wherein the sequences' one or more components are either +1 or −1, or a multiple thereof.

41. The apparatus according to claim 31, wherein the compensating means comprises a processing element for blocking one or more frequency components of the established transmission power control command sequence thereby forming a compensated transmission power control command sequence.

42. The device according to claim 41, wherein the compensating means comprises a processing element for blocking one or more frequency components being a filter.

43. The apparatus according to claim 42, wherein one or more transmission power control command components representing one or more frequencies greater than the oscillation frequency of the oscillations in the corresponding transmission power level are filtered out, entirely or partially if power of frequency components above the oscillation frequency are greater than power of frequency components below, and that one or more transmission power control command components representing one or more frequencies essentially equal to the oscillation frequency are filtered out essentially entirely.

44. The apparatus according to claim 42, wherein one or more transmission power control command components representing one or more frequencies essentially equal to the oscillation frequency of the oscillations in the corresponding transmission power level are filtered out, essentially entirely, if power of frequency components below the oscillation frequency are greater than power of frequency components above.

45. The apparatus according to claim 41, wherein the processing element comprises a frequency transformation entity and blocking is achieved by means of canceling frequency transform coefficients of a frequency transformed signal.

46. The apparatus according to claim 41, wherein the processing element blocks as present one or more frequency components below a frequency threshold.

47. The apparatus according to claim 46, wherein the processing element blocks as present one or more frequency components of energy larger than energy of frequency content above the threshold.

48. The apparatus according to claim 46, wherein the frequency threshold is set equal to the oscillation frequency.

49. The apparatus according to claim 31, wherein oscillation is detected by means of frequency analysis.

50. The apparatus according to claim 31, wherein loop delay is estimated in relation to oscillation cycle time.

51. The apparatus according to claim 50, wherein loop delay is estimated to be essentially equal to one fourth of the cycle time.

52. The apparatus according to claim 31, wherein it compensates for an identified oscillation until number of identical transmission power control commands of the established transmission power control command sequence exceeds a threshold.

53. The apparatus according to claim 52, wherein the threshold corresponds to essentially four times the loop delay.

54. The apparatus according to claim 31, wherein oscillations of one or more radio links, for which transmission power level and cell interference are correlated to a greater extent than indicated by a predefined threshold, are compensated for.

* * * * *

UNITED STATES PATENT AND TRADEMARK OFFICE
CERTIFICATE OF CORRECTION

| | | |
|---|---|---|
| PATENT NO. | : 7,711,385 B2 | |
| APPLICATION NO. | : 10/595287 | |
| DATED | : May 4, 2010 | |
| INVENTOR(S) | : Ostman et al. | |

It is certified that error appears in the above-identified patent and that said Letters Patent is hereby corrected as shown below:

Delete title page showing an illustrative figure and substitute the attached title page therefor.

On the Title Page, in Field (75), under "Inventors", in Column 1, Line 1, before "Ostman,", insert -- Leif --.

On the Title Page, in Field (75), under "Inventors", in Column 1, Line 2, before "Pettersson,", insert -- Frank Rune --.

On the Title Page, in Figure, delete "Predistiorsion" and insert -- Predistorsion --, therefor.

Delete sheet 3 of 9, and substitute the attached sheet 3 of 9 therefor.

In Fig. 3, Sheet 3 of 9, delete "Predistiorsion" and insert -- Predistorsion --, therefor.

In Fig. 4, Sheet 4 of 9, delete "Predistiorsion" and insert -- Predistorsion --, therefor.

In Column 4, Line 64, delete "FIG. 44." and insert -- FIG. 4. --, therefor.

Signed and Sealed this
Eleventh Day of October, 2011

David J. Kappos
*Director of the United States Patent and Trademark Office*

(12) United States Patent
Ostman et al.

(10) Patent No.: US 7,711,385 B2
(45) Date of Patent: May 4, 2010

(54) METHOD AND SYSTEM OF TRANSMISSION POWER CONTROL

(75) Inventors: Thomas Ostman, Spanga (SE); Jan Pettersson, Jarfalla (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1064 days.

(21) Appl. No.: 10/595,287

(22) PCT Filed: Oct. 7, 2003

(86) PCT No.: PCT/SE03/01559

§ 371 (c)(1), (2), (4) Date: Apr. 5, 2006

(87) PCT Pub. No.: WO2005/034380

PCT Pub. Date: Apr. 14, 2005

(65) Prior Publication Data

US 2008/0214224 A1    Sep. 4, 2008

(51) Int. Cl.
*H04B 7/00*    (2006.01)

(52) U.S. Cl. .......................... 455/522; 455/69
(58) Field of Classification Search .............. 455/522, 455/69
See application file for complete search history.

(56) References Cited

U.S. PATENT DOCUMENTS

| | | | |
|---|---|---|---|
| 5,852,782 A * | 12/1998 | Komatsu | 455/522 |
| 6,075,974 A * | 6/2000 | Saints et al. | 455/69 |
| 6,493,541 B1 * | 12/2002 | Gunnarsson et al. | 455/69 |

OTHER PUBLICATIONS

Swedish Patent Office International Search Report for PCT/SE03/01559, dated Apr. 15, 2004.

* cited by examiner

*Primary Examiner*—Nay A Maung
*Assistant Examiner*—Angelica M Perez
(74) *Attorney, Agent, or Firm*—Roger S. Burleigh (57) ABSTRACT

The present invention relates to cellular mobile radio systems, and more especially it relates to Code Division Multiple Access, CDMA, cellular mobile radio systems, particularly to transmission power control in such systems. A method and apparatus for transmission of compensated TPC commands when a substantial loop delay is experienced for one or more user equipment entities is disclosed.

54 Claims, 9 Drawing Sheets

Fig. 3